US011151377B2

United States Patent
Han et al.

(10) Patent No.: US 11,151,377 B2
(45) Date of Patent: Oct. 19, 2021

(54) CLOUD DETECTION METHOD BASED ON LANDSAT 8 SNOW-CONTAINING IMAGE

(71) Applicant: CHANG'AN UNIVERSITY, Xi'an (CN)

(72) Inventors: Ling Han, Xi'an (CN); Zhiheng Liu, Xi'an (CN); Tingting Wu, Xi'an (CN)

(73) Assignee: CHANG'AN UNIVERSITY, Xi'An (CN)

( * ) Notice: Subject to any disclaimer, the term of this patent is extended or adjusted under 35 U.S.C. 154(b) by 0 days.

(21) Appl. No.: 16/627,915

(22) PCT Filed: Sep. 17, 2018

(86) PCT No.: PCT/CN2018/105945
§ 371 (c)(1),
(2) Date: Dec. 31, 2019

(87) PCT Pub. No.: WO2019/184269
PCT Pub. Date: Oct. 3, 2019

(65) Prior Publication Data
US 2021/0286970 A1 Sep. 16, 2021

(30) Foreign Application Priority Data

Mar. 30, 2018 (CN) .......................... 201810275450.X

(51) Int. Cl.
*G06K 9/00* (2006.01)
*G06K 9/62* (2006.01)

(52) U.S. Cl.
CPC ......... *G06K 9/0063* (2013.01); *G06K 9/6212* (2013.01); *G06K 2009/00644* (2013.01)

(58) Field of Classification Search
CPC ............... G06K 9/0063; G06K 9/6212; G06K 2009/00644
See application file for complete search history.

(56) References Cited

U.S. PATENT DOCUMENTS 8,594,375 B1 * 11/2013 Padwick .............. G06K 9/4652
382/103
11,010,606 B1 * 5/2021 Bader ................ G06K 9/00664
(Continued)

OTHER PUBLICATIONS

Liu, Yinghui, Steven A. Ackerman, Brent C. Maddux, Jeffrey R. Key, and Richard A. Frey. "Errors in Cloud Detection over the Arctic Using a Satellite Imager and Implications for Observing Feedback Mechanisms". Journal of Climate 23.7 (2010): 1894-1907. <https://doi.org/10.1175/2009JCLI3386.1 >. (Year: 2010).*

*Primary Examiner* — Fayyaz Alam
(74) *Attorney, Agent, or Firm* — Armstrong Teasdale LLP

(57) ABSTRACT

A cloud detection method based on Landsat 8 snow-containing image, including the following steps: Step 1, selecting any Landsat 8 image as a current image; Step 2, obtaining a cloud threshold for delineating a cloud range from the current image; and Step 3, removing false anomalies in the cloud range delineated by the cloud threshold from the current image so as to obtain a cloud image from which the false anomalies have been removed. The present disclosure can effectively solve the problem of confusion of cloud and snow present in conventional cloud detection methods, and is applicable to regions of different latitudes, without limitations by the amount of cloud.

3 Claims, 4 Drawing Sheets

(56) References Cited

U.S. PATENT DOCUMENTS

2005/0013486 A1* 1/2005 Wiedemann ......... G06K 9/6857
                                                    382/181
2019/0286875 A1* 9/2019 Batchelor ............ G06K 9/0063
2020/0320273 A1* 10/2020 Li ........................ G06K 9/6271

* cited by examiner

CLOUD DETECTION METHOD BASED ON LANDSAT 8 SNOW-CONTAINING IMAGE

CROSS REFERENCE TO RELATED APPLICATIONS

This patent application is a National Stage Entry of PCT/CN2018/105945 filed on Sep. 17, 2018, which claims the benefit and priority of Chinese Patent Application No. 201810275450.X filed on Mar. 30, 2018, the disclosures of which are incorporated by reference herein in their entirety as part of the present application.

BACKGROUND

The present disclosure relates to the technical field of remote sensing and image processing technologies, and more particularly, to a cloud detection method for Landsat 8 snow-containing image.

Cloud and snow have similar spectral characteristics in a visible light range, which leads to a phenomenon of misjudging snow as cloud in conventional cloud detection methods. Therefore, it is important to make an accurate cloud detection of snow-containing images by selecting suitable methods.

Since the 1970s, many domestic researchers in the field of remote sensing have conducted research in this region. In recent years, significant results have been achieved in the extraction of ice and snow information based on optical remote sensing data. For example, in 1977, clouds with snow-covered regions are detected based on differences between cloud and snow at a near-infrared waveband. At the near-infrared waveband, cloud pixels have higher reflectivity, whereas snow appears relatively darker, which greatly reduces misjudgment. However, some special types of cloud and snow still have similar spectral characteristics in the near-infrared spectrum. Therefore, the effect of cloud recognition by this method is sometimes good but sometimes bad, with great volatility.

In 2004, snow is recognized based on normalized difference snow index, wherein the cloud detection is performed after snow is masked to reduce the misjudgment of snow. This method can significantly reduce the phenomenon of misjudgment in the cloud detection caused by confusion between cloud and snow, but it is difficult to determine an accurate threshold of the normalized difference snow index, and the effect on detection of thin snow-covered regions is poorer.

In 2001, differentiation between cloud and snow is made based on satellite imagery by using texture features. This method not only reflects statistical information in grayscale in images, but also reflects the relationship and structure of spatial arrangement of objects. Edges of clouds are usually blurred and the gradient is slow. Affected by the terrain, edges of snow-covered lands are typically sharp, so that it can be used to differentiate between cloud and snow. This algorithm works well in cloud detection in snow-covered regions, especially for the detection of thin cirrus. However, various types of clouds are complex and difficult to describe. In addition, a gray-level co-occurrence matrix may reduce the efficiency of this method. Therefore, it is still challenging to achieve automation and high precision.

In 2014, differentiation between cloud and snow is made based on an F-mask algorithm, which may provide a mask of cloud, cloud shadow and snow for each cloud image. The differentiation uses a scene-based threshold algorithm, and apply the same threshold to all pixels in remote sensing images. This method may be used to recognize clouds, cloud shadows, and snow. However, the F-mask algorithm applies the same threshold to all pixels in the remote sensing images, and thus it is not capable of detecting cloud in images containing ground objects with special surface reflectivity.

All of the above methods make some achievements in different degrees, but they are often restricted by cloud types, snow thickness, underlying surface types, etc., thereby resulting in unreliable effects. Therefore, it is urgent to select an accurate cloud detection method based on snow-containing image.

BRIEF DESCRIPTION

In view of the deficiencies of the existing technologies, embodiments of the present disclosure provide a cloud detection method based on Landsat 8 snow-containing image, so as to solve the problem that cloud detection processes in the existing technologies are limited by cloud types, snow thickness, underlying surface types, etc., thereby resulting in unreliable detection effects.

To solve the above technical problems, the present disclosure is implemented by using the following technical solutions.

A cloud detection method based on Landsat 8 snow-containing image includes:

Step 1, selecting any Landsat 8 snow-containing image as a current image;

Step 2, selecting any two waveband of a green waveband, a first infrared waveband and a second infrared waveband as principal components for differentiating between cloud and snow, and calculating a cloud threshold in a gray-scale frequency histogram of the selected principal components based on a fractal summation model, to obtain a cloud threshold for delineating a cloud range from the current image; and Step 3, removing a false anomaly in the cloud range delineated by the cloud threshold from the current image to obtain a cloud image from which the false anomaly has been removed.

The Step 3 includes:

Step 31: superimposing a plurality of principal components capable of differentiating between cloud and snow, retaining cloud common to the plurality of principal components capable of differentiating between cloud and snow, and removing cloud peculiar to each of the principal components; and Step 32, removing the false anomaly in the cloud range delineated from the current image based on a hotspot analysis.

Further, the method also includes:

Step 4: determining the cloud image from which the false anomaly has been removed as a set of discrete points, assuming that a direction is presented in an original coordinate system, and determining the direction as a current direction if all discrete points in the set of discrete points have a smallest standard deviation distance in the direction.

The original coordinate system takes any vertex of the cloud image as a coordinate origin, a horizontal direction as an x-axis, and a vertical direction as a y-axis.

Assuming that an angle between the current direction and the x-axis of the original coordinate system is $\theta$, an original coordinate axis is rotated by $\theta$ in a clockwise direction to obtain a new coordinate system X'O'Y', wherein a coordinate origin O' of the new coordinate system X'O'Y' is an average midpoint of all points in the set of discrete points.

A standard deviation ellipse is drawn for all anomalous groups of discrete points in the new coordinate system X'O'Y', and the anomalous group of discrete points is determined as false anomaly and is removed if a long-axis direction of the standard deviation ellipse is the same as a mountain direction or a fracture structure extension direction.

Further, the first infrared waveband has a wavelength of 1.6 μm, and the second infrared waveband has a wavelength of 2.1 μm.

Compared with the existing technologies, the present disclosure has the following technical effects.

The present disclosure has the advantages of high efficiency, high precision, strong practical value, and promotion significance.

The present disclosure can effectively solve the problem of confusion of cloud and snow present in conventional cloud detection methods, and is applicable to regions of different latitudes, without limitations by the amount of cloud.

A "threshold analysis plus spatial clustering analysis plus anisotropy analysis" model proposed by the present disclosure is a comparatively advantageous cloud detection method, and this method has strong universality, especially for snow interfered images difficult for cloud detection.

Specific contents of the present disclosure are further described below in detail with reference to the accompanying drawings.

DETAILED DESCRIPTION

Specific embodiments of the present disclosure are provided hereinafter. It is to be noted that the present disclosure is not limited to the following specific embodiments, and all equivalent modifications made based on the technical solutions of the present application shall fall within the scope for protection of the present disclosure.

Embodiments

Figure 1:
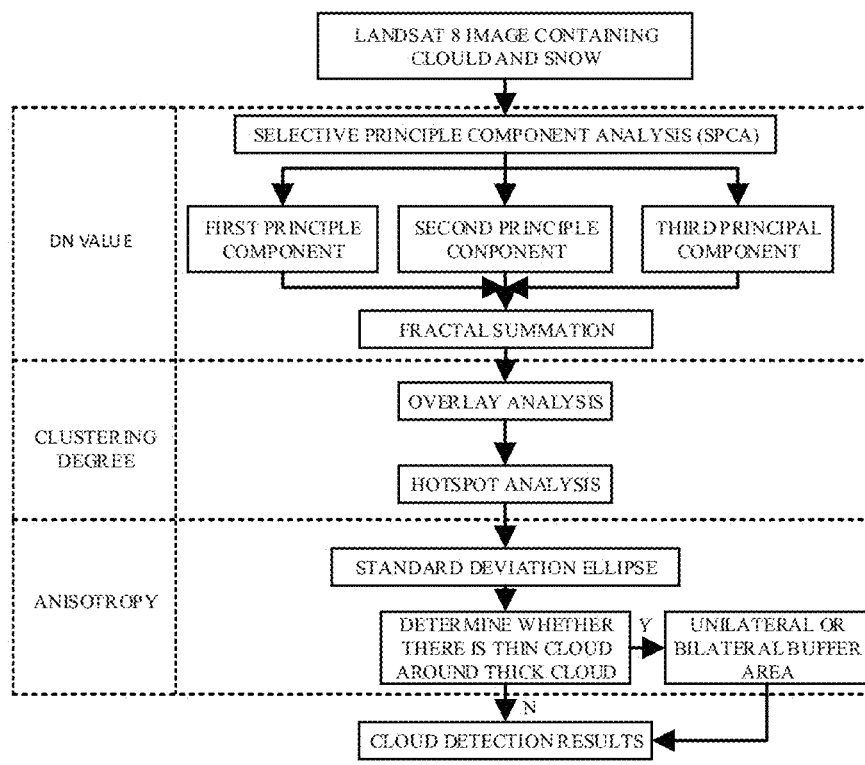
FIG. 1 illustrates an overall flowchart of the present disclosure.

As shown in FIG. 1, this embodiment provides a cloud detection method based on Landsat 8 snow-containing image, which includes following steps.

In Step 1, any Landsat 8 image is selected as a current image.

Landsat 8 images of different sites, of different cloud types and of different snow thicknesses are selected in this embodiment.

In Step 2, any two waveband of a green waveband, a first infrared waveband and a second infrared waveband are selected as principal components for differentiating between cloud and snow, and a cloud threshold in a gray-scale frequency histogram of the selected principal components is calculated based on a fractal summation model, to obtain a cloud threshold for delineating a cloud range from the current image.

The Step 2 specifically includes the following steps.

In Step 21, the green waveband, the first short-wave infrared waveband and the second short-wave infrared band of the current image are selected as principal components to make a component analysis, such that a plurality of principal components are obtained.

Figure 2:
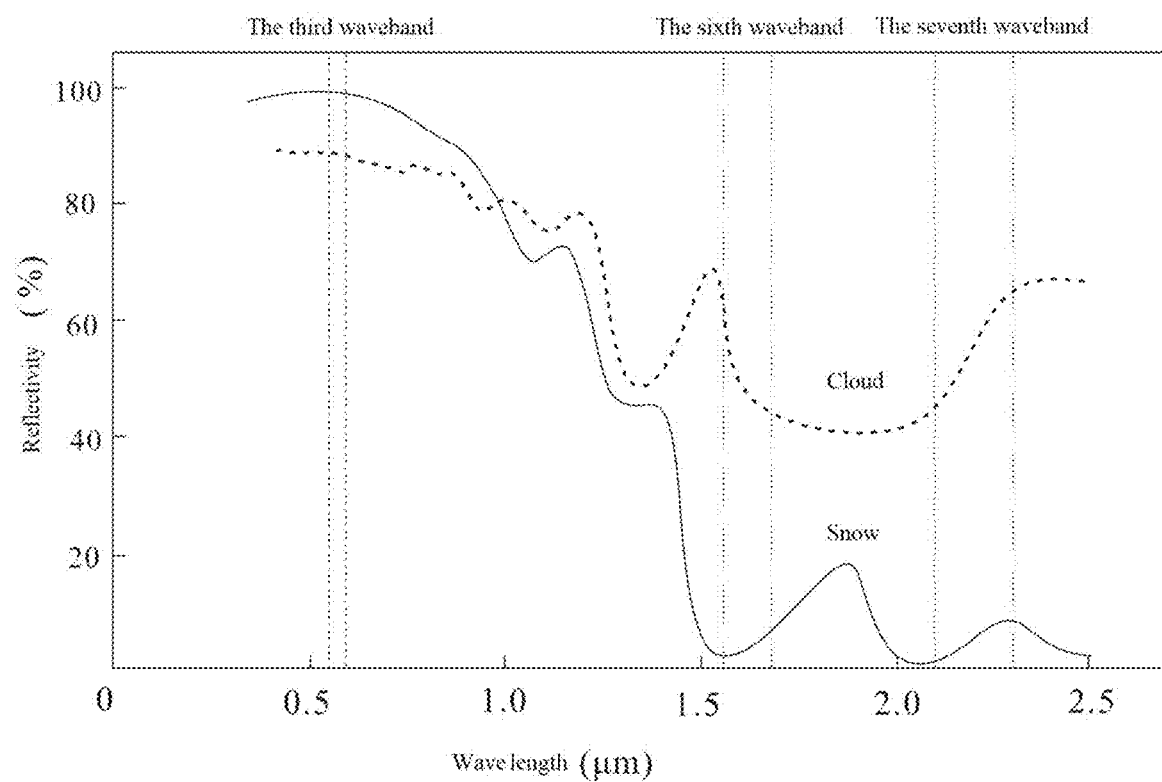
FIG. 2 illustrates reflectivity spectrum curves of cloud and snow.

FIG. 2 illustrates reflectivity distributions of cloud and snow at different wavebands. As can be seen in FIG. 1, at a visible light waveband, a reflectivity of cloud and a reflectivity of snow are both higher than reflectivity of remaining underlying surfaces and both have a similar spectral characteristic. The DN value of the cloud is also substantially close to that of the snow, whereas only the reflectivity of cloud has a larger difference from the reflectivity of the snow at the green waveband. An absorption characteristic of the cloud has a larger difference from an absorption characteristic of the snow at the near-infrared waveband around 1.6 μm and 2.1 μm, the reflectivity of the snow is lower due to stronger absorption of solar radiation, whereas the reflectivity of the cloud is higher due to reflection from the sun. That is, both the cloud and the snow have typical spectral characteristics at the green waveband, the first short-wave infrared band and the second short-wave infrared band, such that information of the cloud and of the snow can be completely represented.

In Step 22, a plurality of principal components capable of differentiating between cloud and snow are selected from the plurality of principle components.

By performing a principal component analysis on the green waveband, the first short-wave infrared waveband and the second short-wave infrared waveband, the wavebands that the cloud and snow are mixed together can be removed, information to be extracted can be enhanced, noise can be isolated while data dimensionality is reduced, a polytomized variable can be simplified into a few independent aggregate variables, and different types of objects originally mixed together can be separated into different principal components, as shown in FIG. 3.

Table 1 lists information of each principal component obtained after a principal component analysis is performed. As can be seen from Table 1, the first principal component can indeed reflect that the cloud's characteristic value is positive at the green waveband, but are negative at the first short-wave infrared waveband and the second short-wave infrared band, which corresponds to the absorption and reflection characteristics of the cloud. However, both the cloud and the snow have such characteristics. The first principal component not only can reflect the characteristics of the cloud but also can reflect the characteristics of the snow, which makes it difficult to differentiate between the cloud and the snow. Thus, the first principal component mainly indicates reflection of brightness, and higher brightness does not characterize the cloud only. Furthermore, the second principal component also corresponds to the characteristics of the cloud. The reflectivity of the cloud is lower than that of the snow at the green waveband, and the characteristic value of the cloud is just negative here, which exactly satisfies this characteristic. Therefore, the second principal component reflects the comparison between the cloud and the snow. The third principal component is positive at the second short-wave infrared band, and the cloud has higher reflectivity than the snow at this second short-wave infrared band. Therefore, the third principal component also reflects the characteristics of the cloud.

On the whole, although the first principal component can reflect the cloud, it may bring in more false anomalies. Whereas the second principal component and the third principal component represent the spectrum differences between the cloud and the snow to a large extent, and thus they are more advantageous to extracting the cloud.

Figures 3A, 3B, 3C:
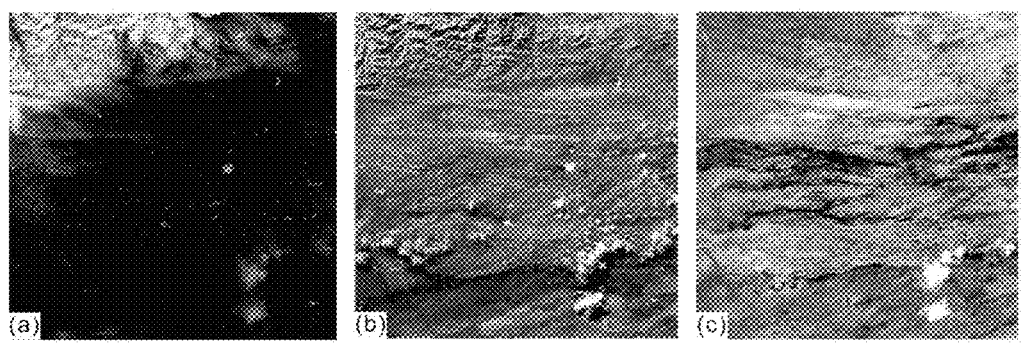
FIG. 3A illustrates a first principal component image obtained after a principal component analysis in this embodiment.
FIG. 3B illustrates a second principal component image obtained after a principal component analysis in this embodiment.
FIG. 3C illustrates a third principal component image obtained after a principal component analysis in this embodiment.

As shown in FIG. 3A, the brightest part of the first principal component is ice and snow instead of cloud, and the characteristics of the cloud are masked. The second principal component and the third principal component in FIG. 3B and FIG. 3C represent the characteristics of the cloud comparably clearly, wherein the brightness of the cloud is the highest in the third principal component, which is exactly opposite to the case in the first principal component.

In summary, in this embodiment, the first principal component is abandoned, and the second principal component and the third principal component are selected.

TABLE 1

Characteristic vectors and characteristic values of each principal component

| | Green waveband | First short-wave infrared band | Second short-wave infrared band | Characteristic value (%) |
|---|---|---|---|---|
| First principal component | 0.85 | −0.53 | −0.02 | 73.58% |
| Second principal component | −0.41 | −0.62 | −0.66 | 26.30% |
| Third principal component | −0.34 | −0.57 | 0.75 | 0.12% |

In Step 23, a cloud threshold capable of delineating a cloud range may be obtained from the current image by selecting a cloud threshold in the gray-scale frequency histogram of a plurality of principal components capable of differentiating between cloud and snow based on a fractal summation model.

The fractal summation model may be expressed by the following equation:

$$N(r) = C \cdot r^{-D_n}$$

where r represents a characteristic linear measurement. In this embodiment, r represents that image pixel values are arranged from small to large; $D_n$ (n=1, 2, 3, 4 ...) represents a fractal dimension, wherein each dimension corresponds to a linear scale-free interval, and represents the number of pixels the pixel value of which is equal to or greater than the corresponding r value or the sum of the pixel values.

The following equation is obtained by taking the logarithm of the above formula:

$$\log N(r) = -D \log(r) + \log C$$

Figures 4, 5:
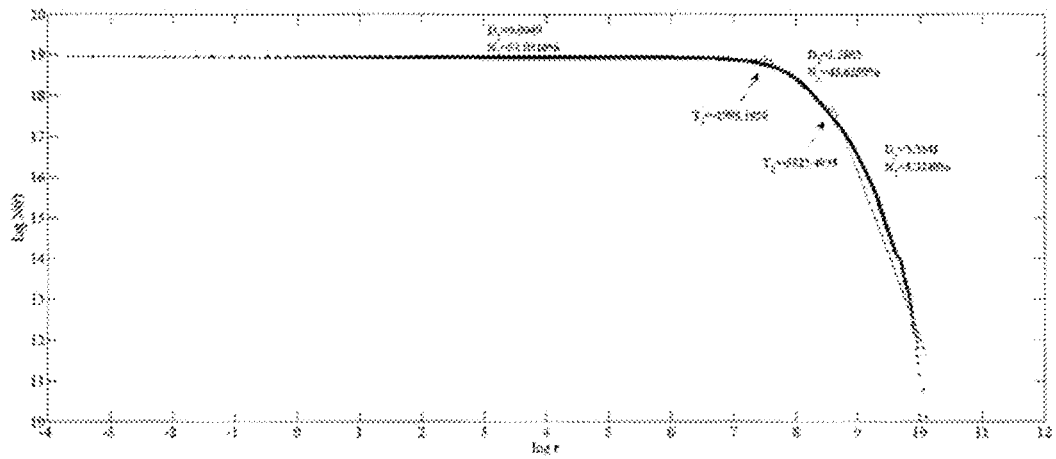
FIG. 4 illustrates a diagram of fractal summation of log r and log N(r) of the second principal component.
FIG. 5 illustrates a diagram of fractal summation of log r and log N(r) of the third principal component.

As shown in FIG. 4 and FIG. 5, the curve of log N(r) and curve of log(r) may produce a plurality of straight lines (at least two) with different slopes: $D_{1, 2, 3 \ldots}$. A single straight line may be fitted to one straight line by a data set $(N(r_i), r_i)$ (i=1, 2, ... N), and its slope is denoted as D. For a method of least squares fitting two straight line segments having two slopes $D_1$ and $D_2$, a division point is determined by an optimum least-squares regression method, i.e., residual sum of squares (RSS). The RSS is defined as follows:

$$RSS = \sum_{i=1}^{i_0} [\lg N(r_i) + D_1 \lg r_i - \lg C_1]^2 + \sum_{i=i_0+1}^{N} [\lg N(r_i) + D_2 \lg r_i - \lg C_2]^2 \to \text{Min}$$

where $T_n$ represents a cut-off point, i.e., thresholds of various types of abnormal. In a similar manner, the slopes of a plurality of scale-invariant segments and the thresholds thereof ($T_n$, n=1, 2, 3 ...) can be accurately determined. $T_1$ and $T_2$ in FIG. 4 and FIG. 5 represent threshold cut-off points.

The fractal summation model in this embodiment is specifically implemented in MATLAB. When the fractal summation model is used for cloud extraction, cloud and a part of the snow are classified into a same fractal scale-free interval. As shown in FIG. 4, $D_1$ and $D_2$ mainly represent ground objects, and $D_3$ mainly represents cloud, but it is also mixed with many false anomalies associated with ice and snow. In FIG. 5, $D_2$ and $D_3$ represent cloud regions. $T_1$=221.4064 is the lower limit of true anomaly. Most of false anomalies come from snow in the northeast (having lower reflectivity) and desert. The results of PC2 and PC3 indicate that the cloud detection to which the fractal summation model is applied may lead to many false anomalies, this is because the false anomalies share spectral characteristics with true anomalies. The part common to the second principal component and the third principal component mainly includes true anomaly, and sporadic snow. The part peculiar to the second principal component is snow having higher reflectivity, which is caused by the phenomenon of different object with the same spectra characteristics between cloud and snow. The part peculiar to the third principal component includes salt & pepper noise generated by ground objects with higher reflectivity on the ground and the snow with lower reflectivity. Although the effect of the fractal summation model is better than the threshold method, due to the presence of the phenomenon of different object with the same spectra characteristics, the size of pixel digital number cannot distinguish the ground objects. In this case, thinking should be changed to another diagnostic feature: spatial distribution.

In Step 3, a false anomaly is removed in the cloud range delineated by the cloud threshold from the current image to obtain a cloud image from which the false anomaly has been removed.

In Step 31, a plurality of principal components capable of differentiating between cloud and snow are superimposed, cloud common to the plurality of principal components capable of differentiating between cloud and snow is retained, and cloud peculiar to each of the principal components is removed.

In this embodiment, overlay analysis is performed on the second principal component and the third principal component by using the Arcgis software, anomalies peculiar to each of the principal components are removed, cloud common to the principal components is retained, and all true anomalies are retained, but a part of common noises are retained.

In Step 32, the false anomaly in the cloud range delineated is removed from the current image based on a hotspot analysis.

Figure 6:
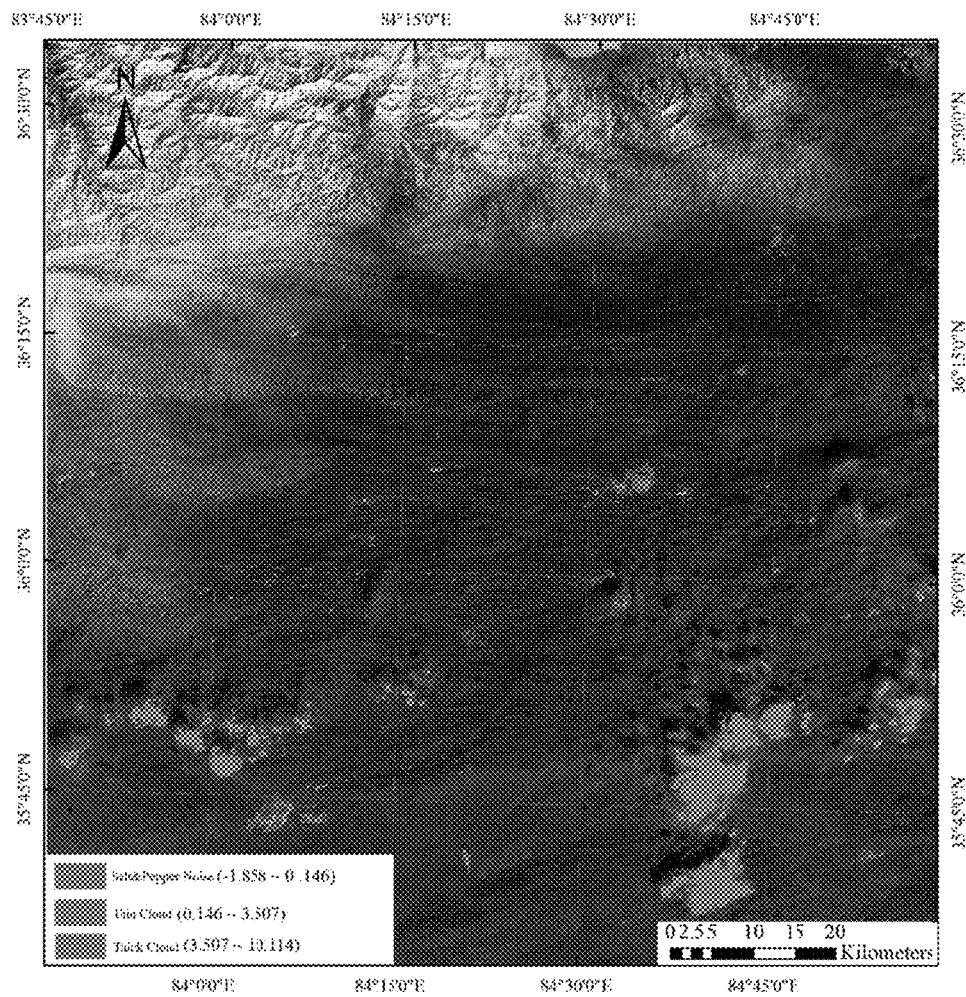
FIG. 6 illustrates a result obtained after a hotspot analysis in this embodiment.

As a determination mode in local spatial self-correlation, the hotspot analysis is used to calculate a statistical value for each element hotspot according to all elements in a certain analytical scale, so as to obtain z score of each element. Based on the hotspot analysis using the Arcgis software, locations where high values or low values are clustered in space may be known. Statistically, a positive z score represents hotspots, and the higher the z score is, the more closely the hotspots are gathered. A negative z score represents coldspots, and the lower the z score is, the more closely the coldspots are gathered. According to statistical principles, the higher or the lower the z scores of hotspot parameters are, the larger the degree of spatial clustering is; and the closer the z score is to 0, the more discrete the hotspots are. As can be seen, thick cloud has the highest z score, closely followed by thin cloud, and ice and snow have z scores close to 0. The range of the z scores and final results in the hotspot analysis in this embodiment are as shown in FIG. 6.

In addition to clustering and dispersing differences, points in space also have directional difference, and thus the appearance of snow is consistent with a mountain direction, i.e., directionality.

In Step 4, the cloud image from which the false anomaly has been removed is determined as a set of discrete points, assuming that a direction is presented in an original coordinate system, and the direction is determined as a current direction if all discrete points in the set of discrete points have a smallest standard deviation distance in the direction.

The original coordinate system takes any vertex of the cloud image as a coordinate origin, a horizontal direction as an x-axis, and a vertical direction as a y-axis.

Assuming that an angle between the current direction and the x-axis of the original coordinate system is θ, an original coordinate axis is rotated by θ in a clockwise direction to obtain a new coordinate system X'O'Y', wherein a coordinate origin O' of the new coordinate system X'O'Y' is an average midpoint of all points in the set of discrete points.

A standard deviation ellipse is drawn for all anomalous groups of discrete points in the new coordinate system X'O'Y', and the anomalous group of discrete points is determined as false anomaly and is removed if a long-axis direction of the standard deviation ellipse is the same as a mountain direction or a fracture structure extension direction.

Figure 7:
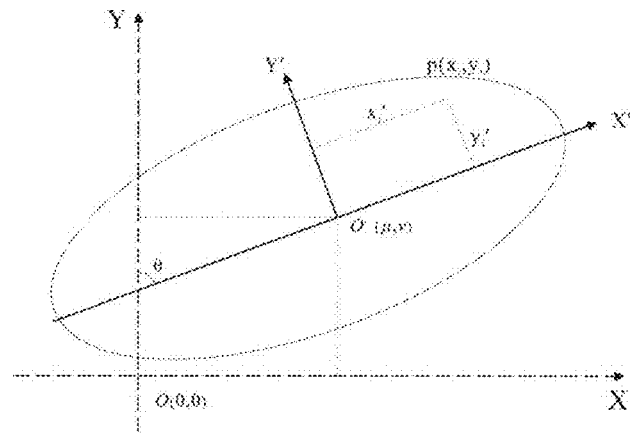
FIG. 7 illustrates a schematic diagram of a standard deviation ellipse.

As shown in FIG. 7, in this embodiment, a standard deviation ellipse is drawn for all anomalous group of discrete points in the new coordinate system X'O'Y' by using the Arcgis software.

The standard deviation ellipse of ice and snow is significantly affected by terrain, which controls altitude, wind direction, climate, and other factors. High-altitude regions are covered with snow all the years, while shady slopes of mountains are more likely to develop ground objects such as frozen soils, snows, and glaciers than sunny slopes. These ground objects may be distinguished according to the geometrical shape of the standard deviation ellipse. This step requires manual inspection for qualitative judgment. This is because the distribution of snow (including glaciers) has a strong orientation, and is obviously controlled by high-altitude mountains or terrains. Atmospheric objects such as cloud and mist have no such limitation. In this embodiment, a standard deviation ellipse is drawn for all anomalous groups of discrete points (polygon groups) by using the Arcgis software, and true anomalies and false anomalies (clouds or ice and snow) are differentiated with reference to similarities and differences between the long-axis direction of the standard deviation ellipse and mountain direction or fracture structure extension direction. By this way, false anomalies of ice and snow may be removed, and thus misjudgment may be reduced. Another advantage of the standard deviation ellipse is to create a buffer region, which is used to recognize residual thin cloud according to wind direction. A weighted buffer region is created at the boundary of the main extension direction of the detected cloud. By this way, the accuracy of cloud detection is greatly improved, and the universality of the cloud detection method is also improved.

What is claimed is:

1. A cloud detection method based on Landsat 8 snow-containing image, the method comprising:

selecting any Landsat 8 snow-containing image as a current image;

selecting any two wavebands of a green waveband, a first infrared waveband, and a second infrared waveband as principal components for differentiating between cloud and snow, and calculating a cloud threshold in a gray-scale frequency histogram of the selected principal component based on a fractal summation model, to obtain a cloud threshold for delineating a cloud range from the current image; and removing a false anomaly in the cloud range delineated by the cloud threshold from the current image to obtain a cloud image from which the false anomaly has been removed by:

superimposing a plurality of principal components capable of differentiating between cloud and snow, retaining cloud common to the plurality of principal components capable of differentiating between cloud and snow, and removing cloud peculiar to each of the principal components; and removing the false anomaly in the cloud range delineated in the current image based on a hotspot analysis.

2. The cloud detection method according to claim 1, the method further comprising:

determining the cloud image from which the false anomaly has been removed as a set of discrete points, assuming that a direction is presented in an original coordinate system, and determining the direction as a current direction if all discrete points in the set of discrete points have a smallest standard deviation distance in the direction;

wherein the original coordinate system takes any vertex of the cloud image as a coordinate origin, a horizontal direction as an x-axis, and a vertical direction as a y-axis;

wherein, assuming that an angle between the current direction and the x-axis of the original coordinate system is θ, an original coordinate axis is rotated by θ in a clockwise direction to obtain a new coordinate system X'O'Y', wherein a coordinate origin O' of the new coordinate system X'O'Y' is an average midpoint of all points in the set of discrete points; and wherein a standard deviation ellipse is drawn for all anomalous groups of discrete points in the new coordinate system X'O'Y', and the anomalous group of discrete points is determined as a false anomaly and is removed if a long-axis direction of the standard deviation ellipse is the same as a mountain direction or a fracture structure extension direction.

3. The cloud detection method according to claim 1, wherein the first infrared waveband has a wavelength of about 1.6 μm, and the second infrared waveband has a wavelength of about 2.1 μm.

* * * * *